April 26, 1949. W. T. EPPLER ET AL 2,468,294
MATERIAL WORKING APPARATUS
Filed June 15, 1945 5 Sheets-Sheet 1

INVENTORS
W. T. EPPLER
W. J. KELLER
BY W. C. Parnell
ATTORNEY

INVENTORS
W. T. EPPLER
W. J. KELLER
BY
W. C. Parnell
ATTORNEY

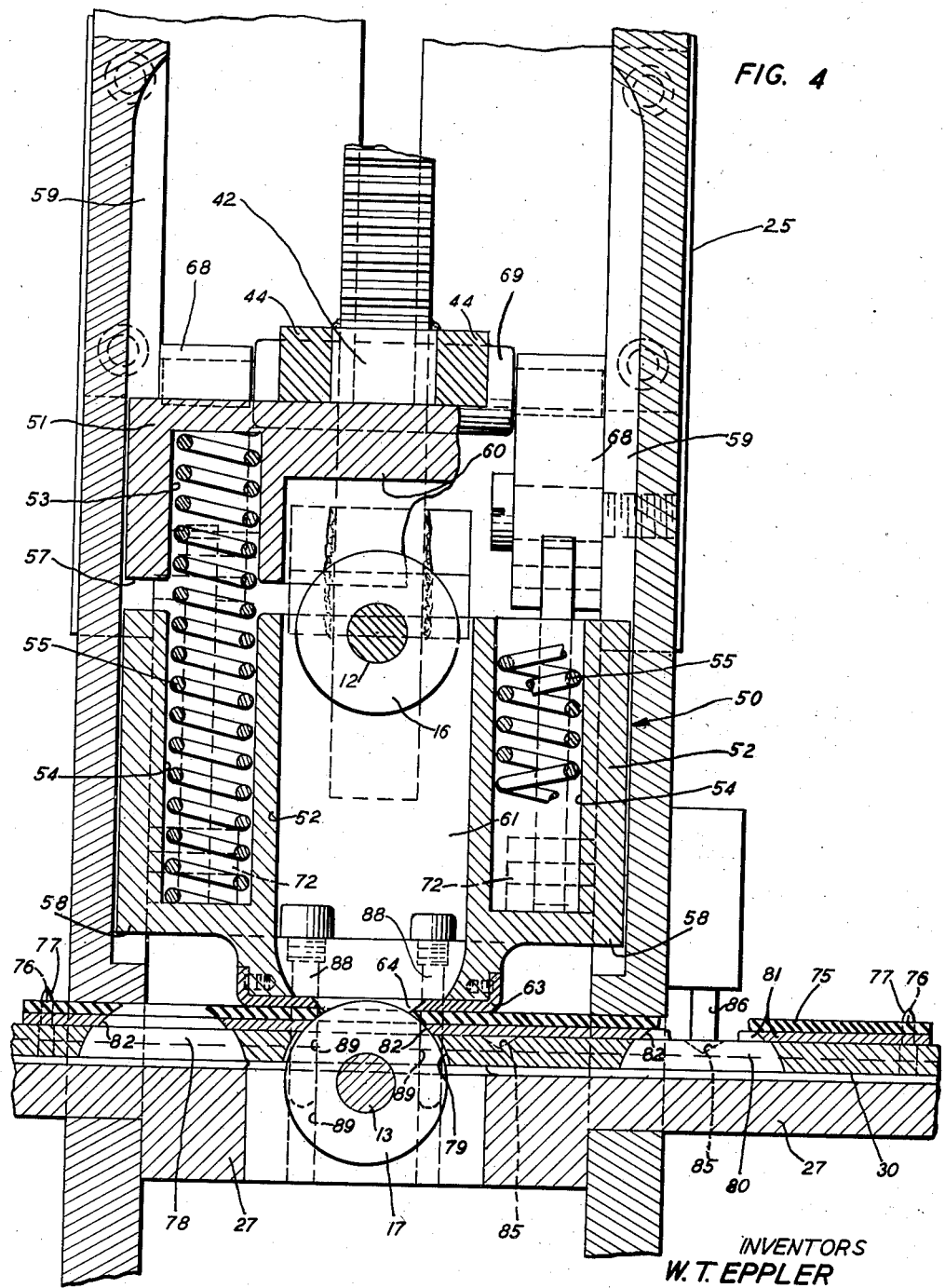

April 26, 1949.   W. T. EPPLER ET AL   2,468,294
MATERIAL WORKING APPARATUS
Filed June 15, 1945   5 Sheets-Sheet 5

INVENTORS
W. T. EPPLER
W. J. KELLER
BY W. C. Parnell
ATTORNEY

Patented Apr. 26, 1949

2,468,294

UNITED STATES PATENT OFFICE 2,468,294

MATERIAL WORKING APPARATUS

Walter T. Eppler, Cranford, and William J. Keller, Jersey City, N. J., assignors to Western Electric Company, Incorporated, New York, N. Y., a corporation of New York Application June 15, 1945, Serial No. 599,570

10 Claims. (Cl. 90—15)

This invention relates to material working apparatus, and more particularly to apparatus for cutting elongate apertures in strips of materials.

Strips of phenol fibre, hard rubber, or the like, are employed in the art of telephony to cover the supporting members for key assemblies in telephone equipment. Materials of this nature are highly brittle and difficulties arise in performing work thereon, particularly in the prevention of chipping portions from the material while cutting elongate apertures therein. Such apertures are formed for the mounting of key units in the key assemblies, the number and positions of apertures varying in the different types of key assemblies employed.

An object of the invention is to provide an apparatus which is simple in structure and highly efficient for cutting elongate apertures in brittle materials.

With this and other objects in view, the invention comprises aperture cutting apparatus by which the required apertures may be partially formed by a cutter engaging one side of the work material and then finished by a second cutter engaging the other side of the material. By forming the aperture in this manner and firmly supporting both sides of the work material in the immediate area of the aperture to be formed, during both cutting operations, it is found that apertures can be cut rapidly in very brittle materials without chipping the edges of the apertures.

In one embodiment of the invention the cutting unit is the reciprocable head of a milling machine with two cutters mounted on spaced parallel shafts. A support for the work material slides on a table interposed between the cutters to move selected portions of the material, where apertures are to be formed, into alignment with the cutters. During the movement of either cutter toward its cutting position, a clamping member engages the material about the portion to be cut and holds it firmly against the support.

Another feature of the invention includes a locating member movable with the clamping member to interengage the work support in advance of the clamping of the material to accurately locate the desired portion of the material in alignment with the cutters.

Other objects and advantages will be apparent from the following detailed description when considered in conjunction with the accompanying drawings, wherein Fig. 1 is a front elevational view of the apparatus shown in combination with the reciprocable head of a milling machine;

Fig. 4 is an enlarged fragmentary sectional view illustrating more in detail the structure shown in Fig. 2;

Fig. 6 is an enlarged fragmentary detailed view illustrating the end of the first cut of one of the elongate apertures;

Fig. 7 is an enlarged fragmentary detailed view of the completed cut of one of the elongate apertures;

Figure 1:
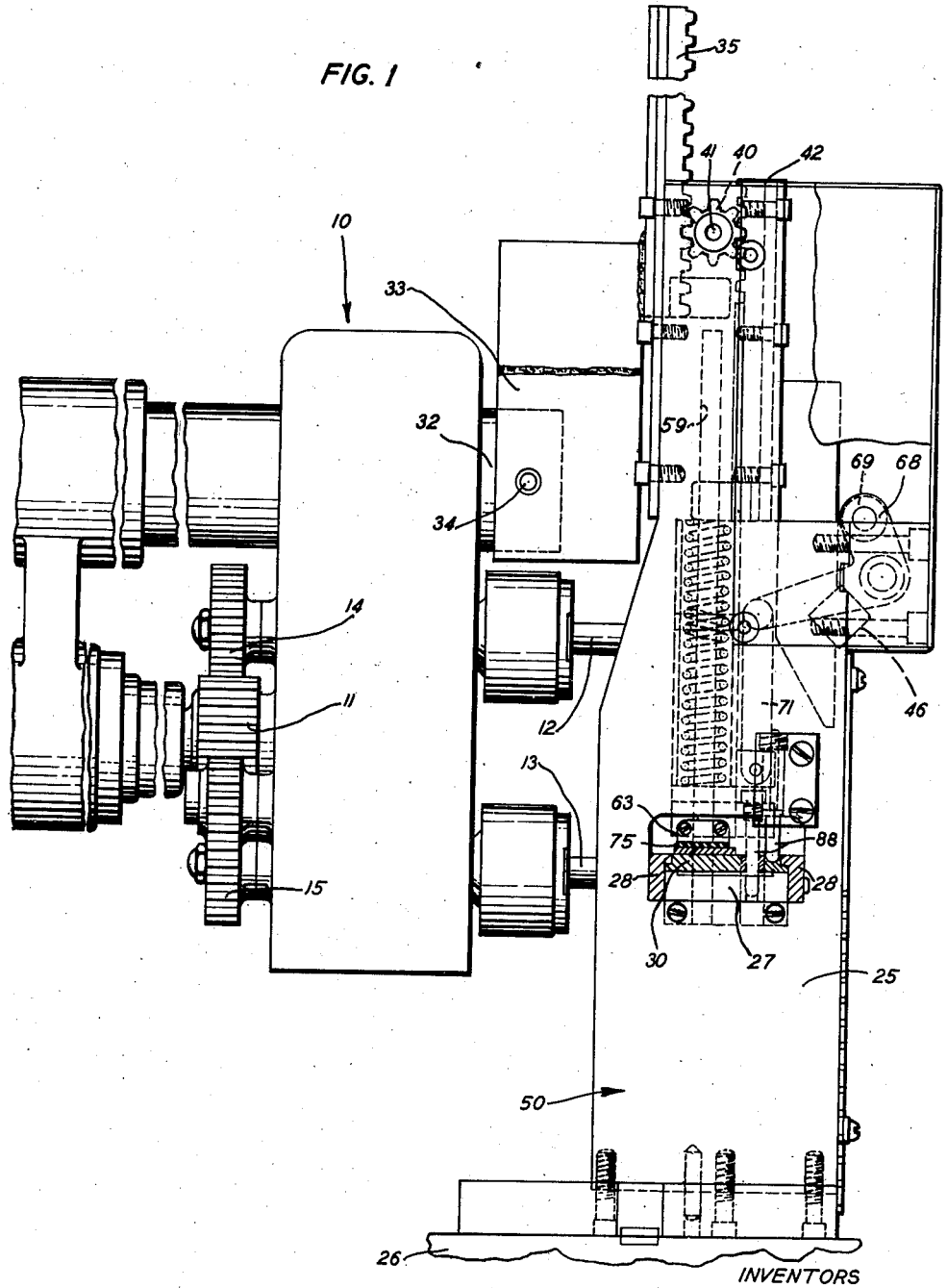
Figure 2:
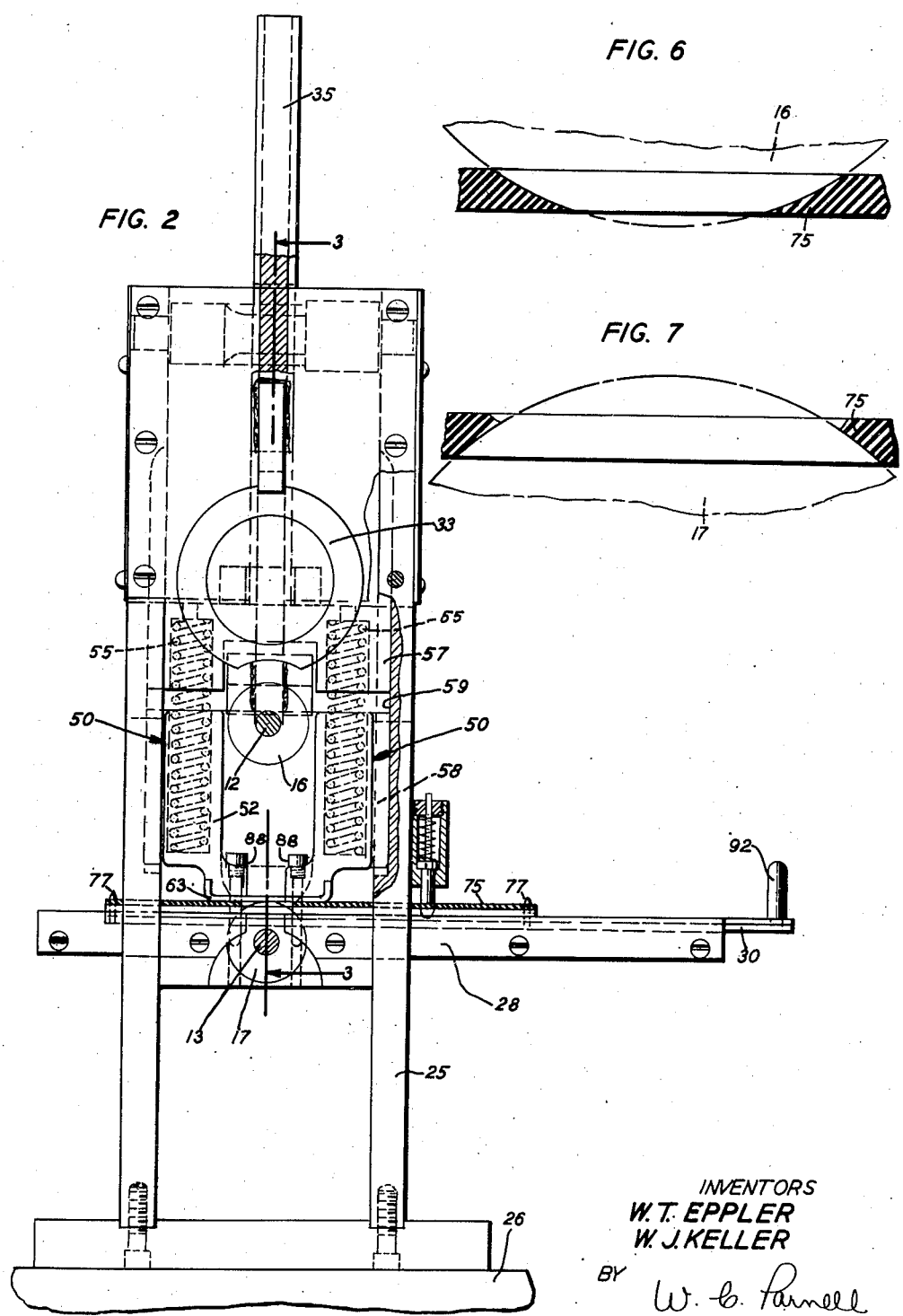
Fig. 2 is a side elevational view of the apparatus, portions thereof being broken away.
Figure 3:
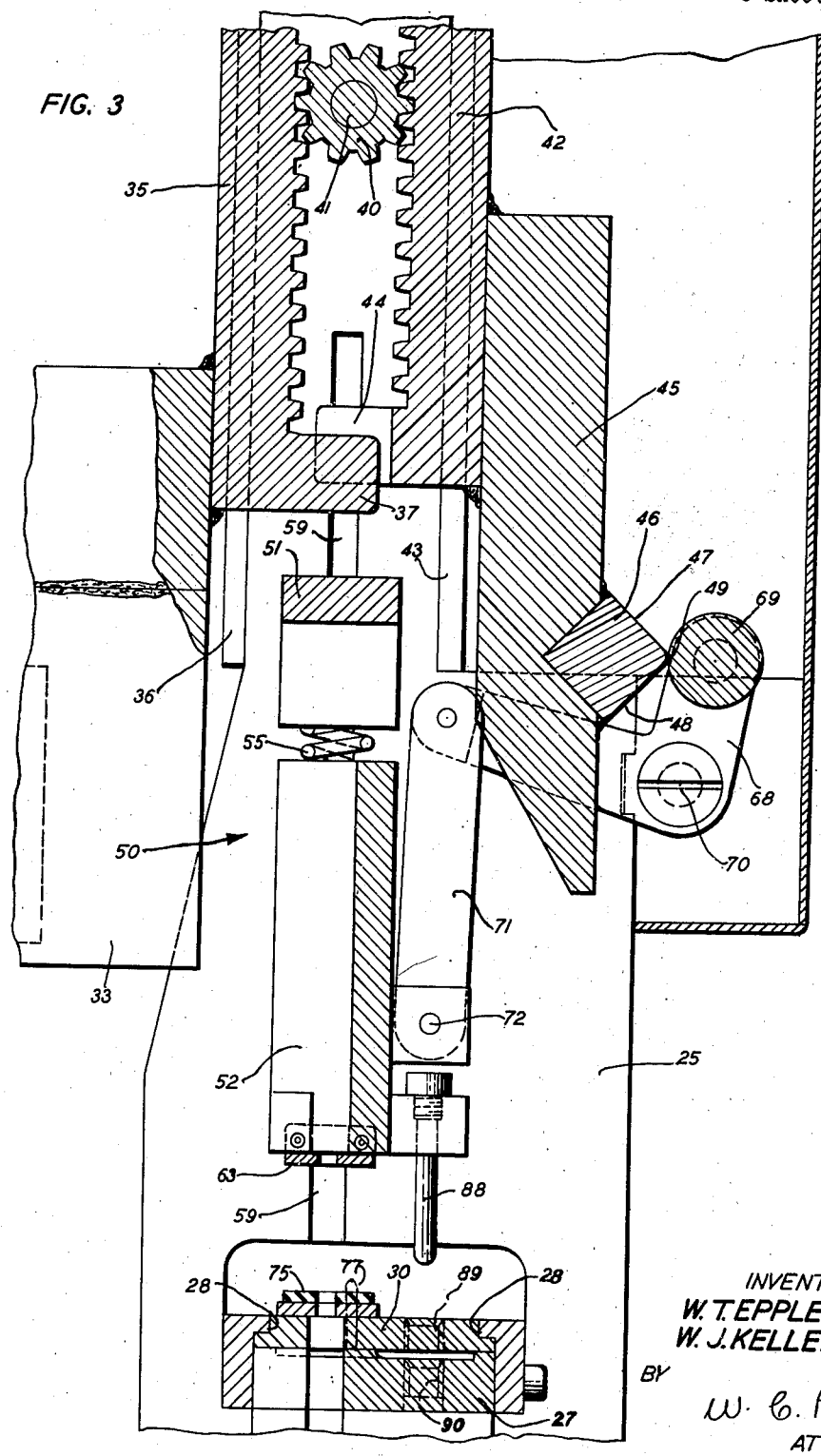
Fig. 3 is an enlarged fragmentary sectional view taken along the line 3—3 of Fig. 2.

Referring now to the drawings, attention is first directed to Fig. 1 which illustrates a cutting unit, indicated generally at 10 and comprising a reciprocable head of a milling machine, the detailed structures of which are commercially known. The features of importance regarding this unit include the driving means 11 for the shafts 12 and 13 through the gears 14 and 15 respectively. Cutting elements in the form of milling cutters or the like, indicated at 16 and 17, Fig. 4, are fixedly mounted upon the shafts 12 and 13, their widths and diameters being of desired sizes, depending upon the contours of the apertures they are to cut into the materials presented thereto. The unit 10 is mounted in a conventional manner (not shown) for reciprocation through the mechanism shown in Fig. 5. This mechanism includes a stationary rack 18, positioned to be engaged by a gear segment 19, the latter mounted for rotation at 20 and rotatable through the aid of a handle 21. The head 10 is suitably supported for vertical movement and through the actuation of the handle 21, the head may be moved from a neutral position, midway of its upper and lower limits, in either direction to move either cutting element 16 or 17 into its cutting position.

Figure 8:
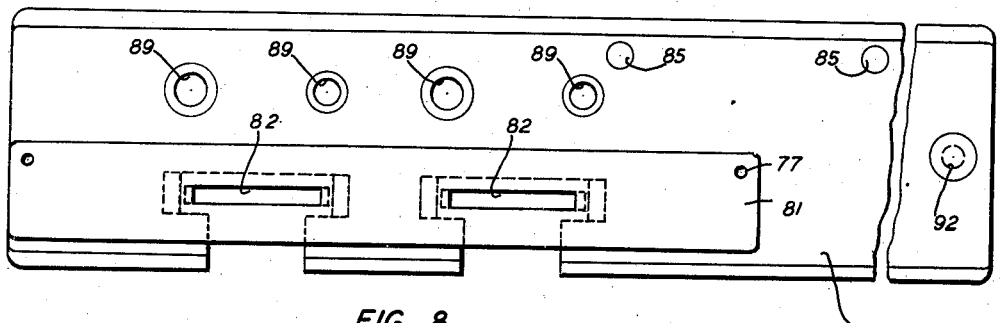
Fig. 8 is a fragmentary top plan view of one of the slides which differs from the slide shown in Figs. 1 to 4, inclusive.
Figure 9:
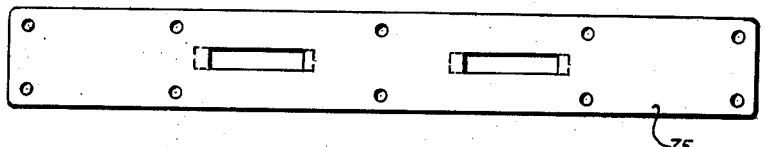
Fig. 9 is a top plan view of one of the materials or strips completed by the aid of the slide shown in Fig. 8.

The apparatus includes a frame structure 25 fixedly mounted upon a suitable support 26 and having a table 27 with parallel guides 28 to receive any one of a plurality of slides. Only two of the various forms of slides are illustrated, one being shown in Figs. 1 to 4, inclusive, and identified with reference numeral 30, the other being shown in Fig. 8 and being identified by reference numeral 31. These slides are equal in width and length, their only differences lying in the supporting portions for their respective materials and the portions or recesses for the temporary location of the slides, together with the apertures or bushings for the positive location of the slides and the materials carried thereby at the cutting positions.

A mounting lug 32 carried by and movable with the unit 10 has a bracket 33 fixed thereto as at 34. The bracket 33 is secured to a rack 35, the latter being movable vertically in guideways 36 in the main frame structure 25. A lug or abutting member 37 is integral with the lower end of the rack 35 (Fig. 3) and extends at right angles therefrom for a purpose hereinafter described. The teeth of the rack 35 interengage a pinion 40 which is mounted for rotation upon a fixed shaft 41 and serves to operatively connect the rack 35 with a rack 42. The rack 42 is also mounted for vertical movement in guideways 43 of the frame 25 and has spaced lugs or abutting members 44 extending at right angles therefrom at the lower end thereof to straddle the lug 37 when the lugs of the racks are moved relative to each other, that is, when the lug 37 of the rack 36 is moved relative to the lugs 44 of the rack 42. The rack 42 has a bracket 45 integral therewith which carries a cam 46 with upper and lower cam surfaces 47 and 48 and a high portion 49.

The racks function during the reciprocable movement of the unit 10 to operate a holding mechanism indicated generally at 50. This mechanism includes an upper element 51 and a lower element 52, both of which have hollow portions 53 and 54, respectively for receiving springs 55. The elements 51 and 52 have tongue portions 57 and 58 at their sides which are slidable in the same guideways 59 of the main frame 25. In general contour, the elements 51 and 52 are substantially U-shaped, providing hollow central portions 60 and 61 for the cutting element 16 during the reciprocable movement of the unit 10 and the elements. The lower portion of the element 52 is substantially closed by a pressure pad 63, which in the present instance is formed of brass or any other suitable relatively soft metal. An opening 64 is formed in the pressure pad 63 of a size and contour to receive the upper cutting element 16 and to cover all portions of the material adjacent the area where the aperture is to be performed therein to eliminate chipping or otherwise damaging of the material during the cutting operation by the cutting elements.

The upper element 51 is positioned in the path of the lugs or abutting members 37 and 44 so that during the downward movement of either rack 35 or 42, the element 51 will be moved downwardly, moving the lower element 52 with it under the force of the springs 55 until the pressure pad engages the material, the springs then being compressed to apply a holding force on the material prior to the cutting operation.

The cam 46 controls cam levers 68 through its engagement with a cam roller 69 to return the elements 51 and 52 to their upper positions after each cutting operation. This mechanism is shown in its neutral position in Fig. 3 with the roller 69 resting upon the high portion 49 of the cam 46. Upon movement of the rack 42 in either direction, the levers 68 will be released and allowed to move about their pivots 70 to free the links 71, supporting the elements 51 and 52 through their pivotal connections 72, so that the elements may be moved downwardly to assume their clamping positions.

The material shown in Figs. 1 to 4, inclusive, and in Figs. 6 and 7 is a strip 75 of phenol fibre previously formed with mounting holes 76 at known positions. The slide or carriage 30 for this particular strip of material is provided with locating pins 77 which extend upwardly from the slide at two or more of the known positions to be receivable in certain of the mounting holes 76 to accurately locate the material on the carriage. The carriage is cut away at portions 78, 79 and 80 to receive the lower cutting element 17 when the carriage is successively moved to present portions of the material at these positions to the cutting elements 16 and 17. To protect all portions of the material at the under surface thereof, adjacent the location where the apertures are to be cut in the material, a protecting plate of brass or other suitable material, indicated at 81, is mounted upon the carriage 30 and is of substantially the same size and contour as the material or strip 75. The protecting strip 81 has elongate openings 82 adjacent the cutaway portions 78, 79 and 80 to allow for the movement of the cutting element 17 a desired distance into the material and to cover and protect all adjacent portions of the material.

The carriage 30 is provided with spaced recesses 85 in its upper surface to successively receive a spring pressed plunger 86 to assist the operator in locating the carriage with the material at the operating or cutting position. Other means for accurately locating the carriage with the material at the cutting position and to lock the carriage against movement during each cutting operation, includes a pair of pins 88 carried by the element 52 and receivable in suitable apertures or bushings 89 in the carriage, as well as in aligned apertures or bushings 90 in the table 27. In this manner, the exact position of the material or strip 75 for receiving an elongate aperture by the operation of the cutters is disposed at the cutting position.

During the operation of the apparatus, the carriage for the type of strips to be worked is selected from the group of carriages of which the carriage 31 is included. The carriages are identical in principal details in that they are conditioned or formed to slide upon the table 27 between the guides 28 and are furnished with cutaway portions at the proper locations for the elongate apertures for the key units to be disposed therein. Furthermore, the desired number of the operating positions and their locations with respect to each other vary for the various types of strips, the corresponding variations in the locating bushings 89 and the locating recesses 85 being a part of the varying features of the carriages. In each instance, a handle 92 is provided to assist in the movement of the selected slide from a loading position into the operating positions and for the removal of the slides from the apparatus.

In the present illustration, the strip 75 shown in Fig. 4 is at its central position with the lower cutting element 17 completing the cutting of the second or central aperture, the first aperture having been completed as illustrated in this figure. The unit 10 is, therefore, in the position shown in Fig. 1, with the cutting elements 16 and 17 continuously rotating. The next step of the operation is the returning of the lever 21 (Fig. 5) to its neutral or horizontal position to return the racks 35 and 42 to the position shown in Fig. 3, removing the pins 88 from their locking positions with the carriage 30 and table 27 and positioning the cutting elements equal distances above and below the carriage 30. The carriage is now free to be moved for the final operation upon the material or strip 75. The operator then moves the carriage to the left (Fig. 4) until it is temporarily located by the plunger 86 entering the next and last recess 85. At this time, the handle 21 is moved upwardly to move the unit 10 downwardly to move the cutting element 16 toward the material for the performance of the first cutting operation on the material at this position. Before the beginning of the cutting operation, that is, before the cutting element 16 has advanced to the position where it engages the material, several things take place, including the locking of the carriage and the clamping of the material. These features are accomplished through the movement of the cam 46 upwardly to allow the cam roller 69 to ride downwardly upon the cam surface 48 during which movement, the elements 51 and 52 are free to be moved downwardly under the force of the rack 35 or the lug 37 thereof engaging the element 51. The length of the pins 88 assure their movement into the bushings 89 and 90 of the carriage and table prior to the pressure pad 63 coming to rest upon the material so that any longitudinal movement of the material caused by the pins entering their bushings will assure proper positioning of the material prior to the clamping thereof for the cutting operation. Furthermore, the pressure pad 63 comes to rest upon the material and the springs 55 are partially compressed before the cutting element 16 meets the material, the holding force increasing during the advancement of the cutting element 16 to increase the holding force on the material during the cutting operation. During this first cut, an opening as illustrated in Fig. 6, is formed in the material.

Figure 5:
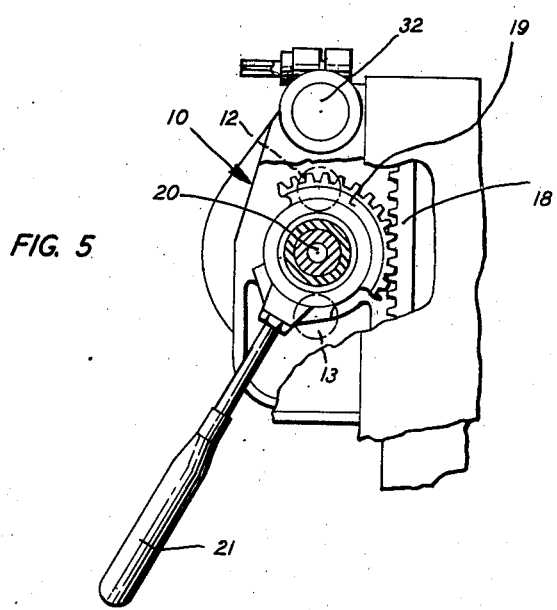
Fig. 5 is a fragmentary detailed view of the operating means for the cutting head.

This completes one half of the cutting operation, the second half of the cutting operation being brought about through the movement of the handle 21 from its upper position to its lower position as shown in Fig. 5. During this operation, the carriage and material are released, as the handle 21 passes the horizontal or neutral position and as the cam 46 moves past the roller 69, but they are not disturbed by the operator and remain to again be held in place and locked against longitudinal movement during a similar cycle of operation. During this cycle of operation, however, the cutting unit 10 is moved upwardly, moving also the rack 35 upwardly, causing rotation of the pinion 40 to move the rack 42 downwardly. The lugs 44 of the rack 42 in this instance engage the element 51 to move it with the element 52 downwardly to again move the pins 88 into their bushings 89 and 90, clamp the material through the pressure of the pad 63 under the force of the springs 55 prior to the time the cutting element 17 reaches the material to complete the cutting of the aperture as illustrated in Fig. 7.

These cycles of operation are carried out for each aperture to be formed or cut into the material. By using the two cutting operations in place of one, the possibility of damaging the material adjacent the aperture is reduced to a minimum and by supporting the material upon each side thereof, completely around the portion where the aperture is to be cut and immediately adjacent the sides and ends thereof, the possibility of damaging the material during the cutting of the apertures has been eliminated.

The plates 81 and the pressure pad 63, being formed of brass, have their apertures formed to engage the sides as well as the peripheries of the cutters to accomplish the thorough protection of the material without causing damage to the cutters. This is due to the fact that the materials of these members 81 and 63 are sufficiently soft. In constructing the apparatus, to assure accurate forming of the apertures in the brass members they are cut in the members by the cutters 16 and 17.

Although specific improvements of the invention have been shown and described, it will be understood that they are but illustrative and that various modifications may be made therein without departing from the scope and spirit of this invention as defined by the appended claims.

What is claimed is:

1. The combination with a cutting unit having spaced rotatable cutters and movable to alternately advance the cutters to a cutting position, of a table mounted at a given position intermediate the cutters, and a support for a material movable on the table to locate a portion of the material at the cutting position and to support the material during alternate operation of the cutters on the said portion of the material to jointly cut an aperture therein.

2. The combination with a cutting unit having spaced rotatable cutters and movable to alternately advance the cutters to a cutting position, of a table mounted at a given position intermediate the cutters, a support for a material movable on the table to locate a portion of the material at the cutting position and to support the material during alternate operation of the cutters on the said portion of the material to jointly cut an aperture therein, and means to firmly hold the material on the support around the portion in which the aperture is cut.

3. A material cutting apparatus in combination with a cutting unit having spaced rotatable cutters movable in a given path to alternately advance the cutters to a cutting position, the apparatus comprising, a support for a material disposed substantially at right angles to the said path intermediate the cutters, apertured to receive portions of the cutters and to support the material around and closely adjacent an aperture to be cut in the material by the cutters, and a pressure pad interposed between the cutters and movable into engagement with the material adjacent the cutting position to cooperate with the support in holding the material against displacement.

4. A material cutting apparatus in combination with a cutting unit having spaced rotatable cutters movable in a given path to alternately advance the cutters to a cutting position, the apparatus comprising, a support for a material disposed substantially at right angles to the said path intermediate the cutters, apertured to receive portions of the cutters and to support the material around and closely adjacent an aperture to be cut in the material by the cutters, a pressure pad interposed between the cutters and movable into engagement with the material adjacent the cutting position to cooperate with the support in holding the material against displacement, and means operatively connected to the cutting unit to move the pressure pad into engagement with the material during movement of the cutters toward the cutting position.

5. In a material working apparatus in combination with a reciprocable rotatable cutter, the apparatus comprising a support for a material apertured to receive a portion of the cutter to support the material around and adjacent an aperture to be cut in the material by the cutter, a pressure pad, apertured to receive a portion of the cutter, movable to apply pressure to the material about and adjacent the portion in which the aperture is to be cut, means movable with the cutter to force the pressure pad under a given pressure in engagement with the material, and additional means actuable to move the pressure pad free of the material.

6. The combination with a cutting unit having spaced rotatable cutters and movable to alternately advance the cutters to a cutting position, of a table mounted at a given position intermediate the cutters, a carriage for a material movable on the table to successively locate predetermined spaced portions of the material at the cutting position and having openings therein at the said portions to receive the cutters and locating apertures therein for the said spaced positions and locating members movable in advance of the cutters to cooperate with the locating apertures to accurately locate the carriage with the successive portions of the material at the cutting position.

7. A material cutting apparatus in combination with a cutting unit having spaced rotatable cutters movable to alternately advance the cutters to a cutting position, the apparatus comprising, a table mounted at a given position intermediate the cutters, a carriage for a material having cutaway portions for receiving the cutters at given spaced positions where apertures are to be cut in the material, means to locate the material on the carriage with respect to the cutaway portions, means to locate the cutaway portions of the carriage successively at the cutting position, and means to engage the material under pressure about the portions where the apertures are to be cut to firmly hold the material during the partial cutting of the material by one of the cutters and during the completion of the cutting of each aperture by the other cutter.

8. In a material working apparatus in combination with a rotatable circular cutter formed of a suitable hard material, the apparatus comprising companion elements, mounted for relative movement to grip an article therebetween, formed of a material which is softer than the cutter and initially apertured thereby to receive and conform to side and peripheral portions of the cutter, whereby all portions of the article adjacent an aperture cut into the article by the cutter are held under pressure, and means to cause relative movement of the elements.

9. In a material working apparatus in combination with spaced rotatable circular cutters formed of a suitable hard material, the apparatus comprising companion elements, mounted intermediate the cutters for relative movement to grip an article therebetween, formed of a material which is softer than the cutters and apertured to receive and conform to side and peripheral portions of the cutters, whereby all portions of the article adjacent an aperture partially cut into the article by one of the cutters and completed by the other cutter are held under pressure, and means to cause relative movement of the elements.

10. The combination with a cutting unit having spaced rotatable cutters and movable to alternately advance the cutters to a cutting position, of a table mounted at a given position intermediate the cutters, a support for a material movable on the table to locate a portion of the material at the cutting position and to support the material during alternate operation of the cutters on the said portion of the material to jointly cut an aperture therein, a pressure pad, a first rack movable with the unit to move the pressure pad in engagement with the material during movement of the unit in one direction, a second rack, and a pinion operatively connecting the racks to cause the second rack to move the pressure pad in engagement with the material during movement of the unit in the opposite direction.

WALTER T. EPPLER.
WILLIAM J. KELLER.

REFERENCES CITED

The following references are of record in the file of this patent:

UNITED STATES PATENTS

| Number | Name | Date |
|---|---|---|
| 939,631 | Reynolds | Nov. 9, 1909 |
| 1,141,713 | Johnson | June 1, 1915 |
| 2,077,118 | Lewis | Apr. 13, 1937 |
| 2,124,094 | Wenzel | July 19, 1938 |
| 2,265,050 | Wierth | Dec. 2, 1941 |